United States Patent [19]

Pogharian et al.

[11] Patent Number: 4,458,393
[45] Date of Patent: Jul. 10, 1984

[54] JEWELRY CLASP

[76] Inventors: Mardig V. Pogharian; Vahan M. Pogharian, both of 8513 Fullbright Ave., Canoga Park, Calif. 91306

[21] Appl. No.: 316,293

[22] Filed: Oct. 29, 1981

[51] Int. Cl.³ ............................................. A44B 13/02
[52] U.S. Cl. ..................................................... 24/234
[58] Field of Search ................ 24/234, 235, 327, 500, 24/508, 509, 510

[56] References Cited

U.S. PATENT DOCUMENTS 171,361 12/1875 Dudley ................................. 24/234
341,608 5/1886 Seaman ................................ 24/234

Primary Examiner—F. Barry Shay
Attorney, Agent, or Firm—John Joseph Hall

[57] ABSTRACT

A jewelry clasp having a spring actuated catch member pivotally mounted inside a housing, said clasp member having a hook member with a tip engaging the bottom of the housing.

2 Claims, 5 Drawing Figures

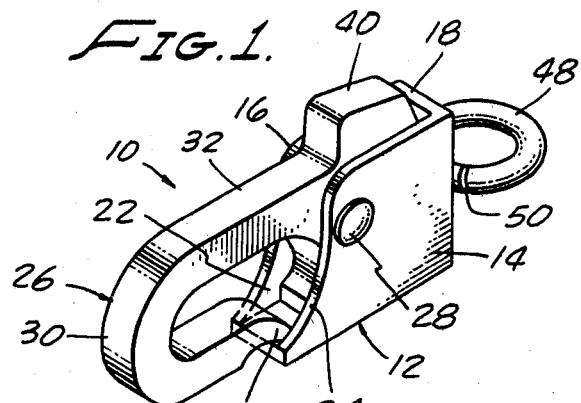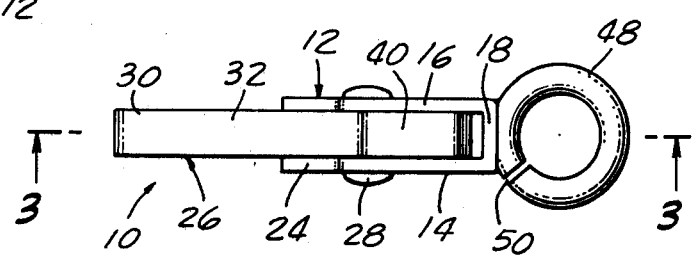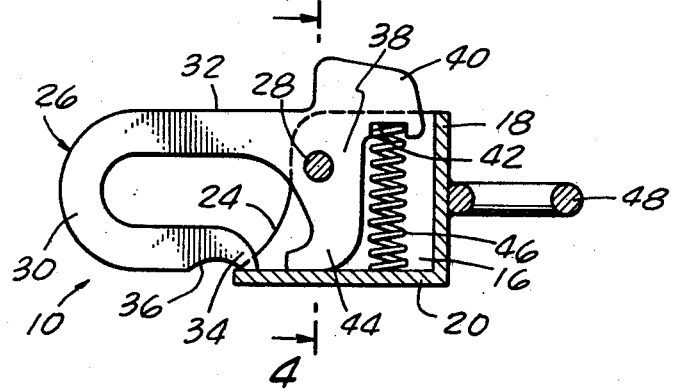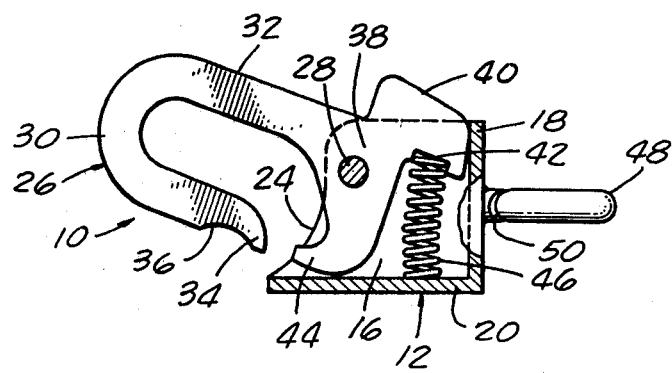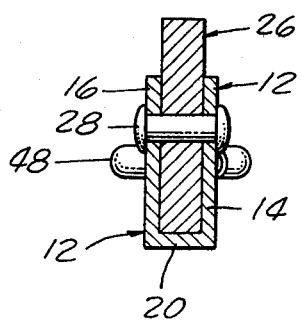

JEWELRY CLASP

SUMMARY OF THE INVENTION

Conventional jewelry clasps known in the prior art have certain draw backs. Either they are cumbersome to use, or are of fragile construction and fail to securely clasp the desired jewelry. Such conventional jewelry clasps are also not suited for easy manufacture in large quantities.

The present invention provides an improved jewelry clasp with a spring actuated clasp member pivotally mounted in a housing and having a hook with a tip that engages the bottom edge of the housing. The hook member has a concavity at the bottom portion of the tip to provide easy means for disengaging the tip of the hook from the bottom edge of the housing.

The invention provides a relatively simple, yet secure clasp for various kinds of jewelry.

It is, therefore, an object of this invention to provide a relatively simple but secure clasp for various kinds of jewelry.

Another object of this invention is to provide a jewelry clasp which is relatively easy to manufacture in large quantities because of its design.

A further object of this invention is to provide a jewelry clasp which is relatively easy to put in operation, yet secure and reliable at all times.

A yet further object of this invention is to provide a jewelry clasp which has sturdy construction and is not easily damaged.

These and other objects will be more readily understood by reference to the accompanying drawing of a preferred embodiment in which:

FIG. 1 is a perspective view of the invention in a locked position.

FIG. 2 is a top plan view of the invention.

FIG. 3 is a view taken along line 3—3 of FIG. 2.

FIG. 4 is a view taken along line 4—4 of FIG. 3.

FIG. 5 is a side elevational view of the invention in an unlocked or open position.

The jewelry clasp 10 has a jacket or housing 12 with two opposed and parallel side walls 14 and 16, a back wall 18, and a bottom 20, defining a compartment 22. The outer ends 24 of the side walls 14 and 16 are slightly curved inwardly in their middle portions and tapered outwardly at their lower portions.

Compartment 22 of housing 12 receives a catch member 26 which is pivotally mounted to the side walls 14 and 16 of housing 12 by a rivet 28. Catch member 26 is preferably formed with flat sides for ease in manufacture.

Catch member 26 is formed into a hook 30 at its outer end. The hook 30 has a straight shank portion 32 and a tip 34 which is curved outwardly and has a slight concavity 36 at its bottom portion.

The inner portion of catch member 26 is formed into a support member 38 having a top shoulder portion 40 with a recess 42 and a bottom foot member 44 resting on housing bottom 20.

One end of spring 46 is received in recess 42 and the other end of spring 46 rests on housing bottom 20.

The back wall 18 of housing 12 is provided with a ring 48 attached by any suitable means to back wall 18. Ring 48 may have a slot 50 for insertion of the end of a chain for jewelry (not shown).

Any material having the strength and resilience to carry out the required performance of jewelry clasp 10 may be used, such as a suitable gold alloy or stainless steel and the like.

In operation, the top shoulder portion 40 of jewelry clasp 10 is pressed down, thereby pivoting catch member 26 so that hook member 30 moves away from its engagement with housing bottom 20, which permits the insertion of one end of a chain or other portion of jewelry, and further compresses spring 46. Upon release of shoulder portion 40, spring 46 returns to its normal position and forces catch member 26 to return to its original position, thereby causing hook member 30 to return to its original position with its tip 34 again engaged against housing bottom 20, thereby enclosing and securing the chain end or other jewelry in position.

Concavity 36 at the other end of the hook member 30 facilitates the opening of catch member 26 as desired.

Although we have described our invention with respect to a preferred embodiment, it is understood that various modifications and changes may be made in the location and form of the various elements without departing from the spirit and scope of the invention as defined in the following claims.

We claim:

1. A jewelry clasp, comprising:

a housing having parallel side walls, a back wall, and a bottom wall, defining a compartment, the outer ends of said side walls being curved inwards in their middle portion and tapered outwardly at their lower portions;

a spring-actuated catch member pivotally mounted in said compartment of said housing, and having a hook member that projects forwardly from said housing beyond said outer ends of said side walls, said hook member being formed with a longitudinal straight shank extending outwardly from a support portion of said catch member and projecting beyond said compartment, the hook member being generally U-shaped and including a tip that is received between the lower portions of said side walls and engages said bottom wall when said clasp is closed, an opening being formed between said tip and the foot of said support portion of said catch member, said foot also engaging said bottom wall when said clasp is closed;

pivot pin means passing through said side walls and said support portion of said catch member, above said foot of said support portion and rearwardly of said opening;

shoulder means formed on said support portion of said catch member, extending rearwardly from said pivot pin means and projecting above said side walls; and spring means received between said shoulder means and said bottom wall within said compartment, effective to normally urge said tip into engagement with said bottom wall;

whereby said catch member remains in a closed position when pressed longitudinally, and said catch member will pivot about said pivot pin means against the force of said spring means when pressure is applied to the projecting portion of said shoulder means to thereby disengage said tip from said bottom wall and expose said opening.

2. A hook member according to claim 1, in which the bottom of the outer end of the hook member has a concavity.

* * * * *